United States Patent
Browne et al.

(10) Patent No.: US 6,504,545 B1
(45) Date of Patent: Jan. 7, 2003

(54) ANIMATED FONT CHARACTERS

(75) Inventors: Cameron Bolitho Browne, Burleigh Heads (AU); Paul Quentin Scott, Pymble (AU); Stephen Robert Bruce, Abbottsford (AU); Gerard Anthony Hill, Castle Hill (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/277,817

(22) Filed: Mar. 29, 1999

(30) Foreign Application Priority Data

Mar. 27, 1998 (AU) .............................................. PP2651
Dec. 16, 1998 (AU) .............................................. PP7730

(51) Int. Cl.[7] .............................................. G06T 17/00
(52) U.S. Cl. ...................................................... 345/473
(58) Field of Search ................................. 345/418, 472, 345/473, 467, 468, 470, 471, 472.3

(56) References Cited

U.S. PATENT DOCUMENTS

| | | | |
|---|---|---|---|
| 4,213,124 A | | 7/1980 | Barda et al. ................. 340/706 |
| 5,883,639 A | * | 3/1999 | Walton et al. .............. 345/473 |
| 6,091,505 A | * | 7/2000 | Beaman et al. ............ 358/1.11 |

FOREIGN PATENT DOCUMENTS

| | | |
|---|---|---|
| AU | 199884252 B2 | 4/1999 |
| EP | 0902378 | 3/1999 |

OTHER PUBLICATIONS

T. Porter et al., Compositing Digital Images, Computer Graphics, vol. 18, No. 3, 1984, pp. 253–259.

* cited by examiner

*Primary Examiner*—Cliff N. Vo
(74) *Attorney, Agent, or Firm*—Fitzpatrick, Cella, Harper & Scinto

(57) ABSTRACT

A method and apparatus for creating an animated font character based on an initial non-animated font character. Initially, a glyph representative of at least one aspect of the non-animated font character is provided. A first predetermined function is then applied to the glyph, thereby to generate a modified glyph. A second predetermined function is then provided, for generating an output dependent upon a value of a variable parameter having an initial value. A visual appearance of the modified glyph is based at least partly on the output of the second predetermined function. The modified glyph is then rendered and the value of the variable parameter is altered. The rendering and altering steps are then repeated, which results in the generation of a plurality of rendered modified glyphs that together define an animated font character. Finally, the animated font character is displayed or stored for subsequent reproduction.

49 Claims, 17 Drawing Sheets

ANIMATED FONT CHARACTERS

FIELD OF THE INVENTION

The present invention relates to the field of digital image processing and, in particular, to a method and apparatus for creating animated font characters and fonts based on computer typefaces.

BACKGROUND OF THE INVENTION

Recently, it has become popular to provide computer animated advertising, particularly in relation to Internet-based advertising. Such animated adverts typically include animated text as an attention-seeking tool to "catch" the eye of a viewer. In an otherwise text-filled electronic document, animated text or animated images can provide a visually interesting embellishment that goes beyond coloured or textured characters.

Generally, animated text includes text or symbols (for example, kanji characters) which have the appearance of motion on a video screen. Examples of such animation include: moving text across a screen; flashing text characters on and off; and changing character size, colour or textual appearance.

At present, approaches to animated text require the creation of several key frames from which an animation sequence is achieved by interframe interpolation. Unfortunately, this approach is time consuming since the selected key frames must generally be supplied by a graphic designer, and is an approach much more suited to unconstrained animation such as computer generated "cartoons". In addition, the fonts used for such animated text are proprietary and are generally constructed for application specific tasks. Further, storing such animations on a frame by frame basis can consume relatively large amounts of transmission bandwidth and data storage space, which is undesirable.

Thus, it would be desirable if the animated text process could substantially be automated whilst still maintaining substantial artistic control over each character, thereby reducing the graphic designer's workload. Further, it would also be desirable if the animated text process could use "off the shelf" (industry standard) typefaces as a basis for animated text characters.

SUMMARY OF THE INVENTION

In accordance with a first aspect of the present invention, there is provided a method of creating an animated font character based on an initial non-animated font character, the method including the steps of:

(a) providing a glyph representative of at least one aspect of the non-animated font character;

(b) applying a first predetermined function to the glyph, thereby to generate a modified glyph;

(c) providing a second predetermined function for generating an output dependent upon a value of a variable parameter, the variable parameter having an initial value, wherein a visual appearance of the modified glyph is based at least partly on the output of said second predetermined function;

(d) rendering said modified glyph;

(e) altering the value of the variable parameter;

(f) repeating steps (d) and (e), thereby to generate a plurality of rendered modified glyphs that together define an animated font character; and (g) displaying the animated font character on a display or storing it in memory for subsequent reproduction.

In accordance with a second aspect of the invention, there is provided a method of creating an animated font character, the method including the steps of:

(a) providing a series of glyphs and a font structure, the series of glyphs and the font structure representing font characters;

(b) providing a predetermined function defining at least one characteristic feature of at least one of the glyphs or a part thereof, said predetermined function generating an output value based on at least one variable parameter having an initial value;

(c) rendering said font character in accordance with the output of the predetermined function;

(d) altering the value of said variable parameter;

(e) repeating steps (c) and (d), thereby to generate an animated sequence of rendered frames for the font character; and (f) displaying the animated sequence on a display or storing it in memory for subsequent reproduction.

In accordance with a third aspect of the present invention, there is provided a method of creating a computer animated font character comprising the steps of:

(a) providing a series of glyphs and a font structure representing font characters;

(b) providing a predetermined function describing at least one characteristic feature of part or all the glyph, wherein said predetermined function has at least one variable parameter;

(c) rendering said font character in accordance with the predetermined function;

(d) altering said variable parameter; and (e) repeating steps (c) and (d) to provide an animated sequence for the font character.

In a fourth aspect, the present invention provides a computer apparatus programmed with software instructions for implementing an embodiment of the present invention.

In a fifth aspect, the present invention provides a computer storage medium bearing instructions, in compiled or uncompiled form, for implementing an embodiment of the present invention.

BRIEF DESCRIPTION OF THE DRAWINGS

Notwithstanding any other embodiments which may fall within the scope of the present invention, preferred forms of the invention will now be described, by way of example only, with reference to the accompanying drawings, in which.

DESCRIPTION OF PREFERRED AND OTHER EMBODIMENTS

In the preferred embodiment, a method is provided for the creation of animated font characters, which allows for the creation of animated text.

The principles described in relation to the preferred embodiments can be applied to industry standard typefaces. However, the preferred embodiment utilises the font system set out below and derived from Australian Provisional Patent Specification P09187 entitled "A New Font Architecture for Producing Richer Text " filed Sep. 15, 1997, which has matured into the following patent applications:

Australian Patent Application No. 84252/98
European Patent Application No. 98307431.1
Japanese Patent Application No. 10-280568
U.S. patent application Ser. No. 09/153077.

The utilisation of fonts in images is well known. Traditionally, a font has consisted of a bitmap or an outline. The utilisation of font outlines often provides greater flexibility than a bitmap, especially in scaling operations. This is because a font can be defined for many different sizes by means of re-scaling of the spline data which normally represents the outline of the font.

Although fonts are well known and utilised in computer image generation programs such as word processing programs or higher end graphics programs, they are generally lacking in flexibility and creativity or structure. This often leads to limited or blinkered artistic output results as the utiliser of the font must work within the pre-defined structure.

In Australian provisional specification PO9187, there is disclosed a method of incorporating characters from a font into a document or displaying them on a display medium, wherein the font contains a plurality of glyphs. Each of the glyphs includes one or more shapes, natural or synthesised images, or other glyphs. The method itself includes the steps of:

(a) extracting a description of one or more glyphs from the font; and (b) rendering the characters onto a display medium or including them as part of a document description.

Australian provisional specification PO9187 also discloses a font structure for use in an image creation system comprising a series of characters wherein each character is made up of a customisable glyph structure. The glyph structure further includes a series of graphical objects which can be composited together in a predetermined order.

In this description, a font is represented by a series of character "glyphs". The glyphs have a complex structure which allows their utilisation in the creation of images having much more complex characteristics.

Figure 1:
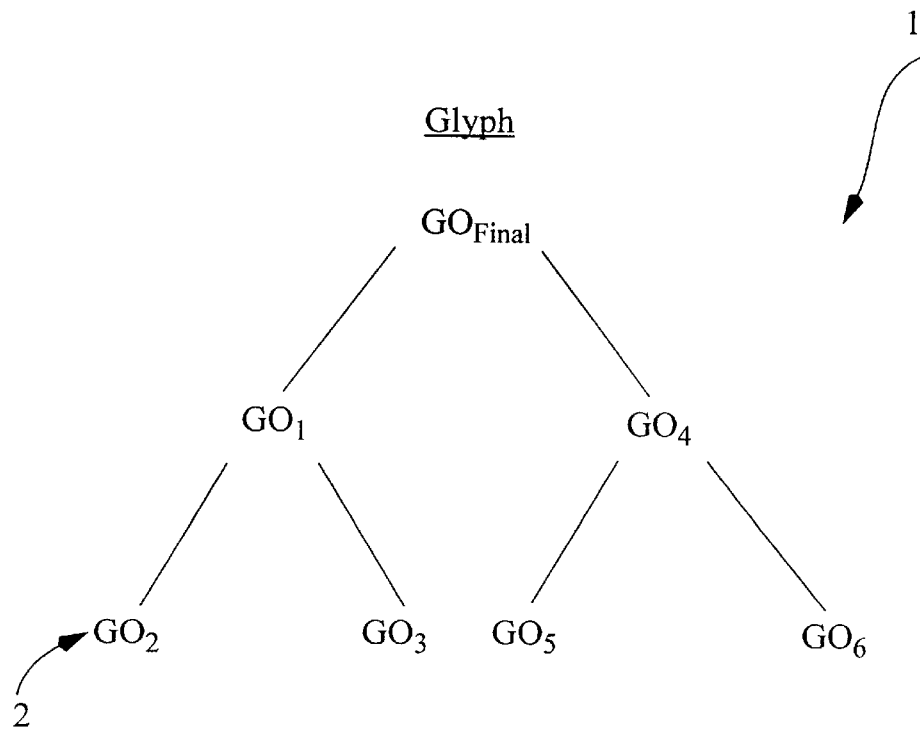
FIG. 1 illustrates the structure of a character glyph.
Figure 2:
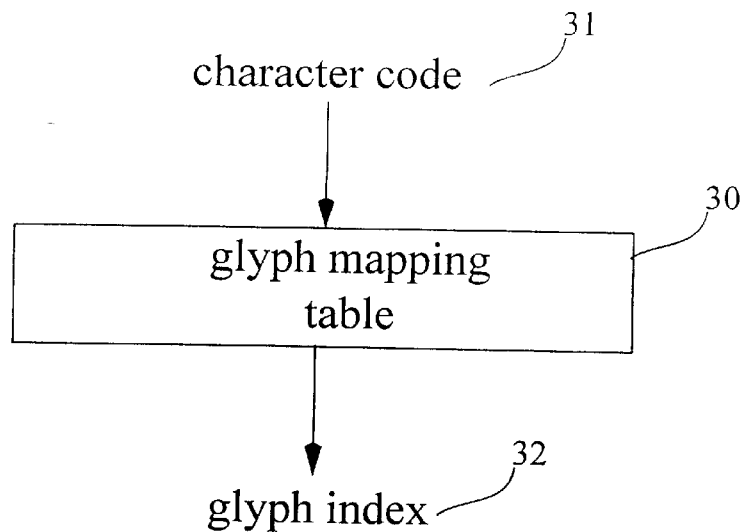
FIG. 2 illustrates the process of deriving a glyph index from a character code.

Turning now to FIG. 1, there is illustrated schematically the structure of a single glyph 1 of a font. In storage, each glyph 1 has a corresponding glyph index number (hereinafter glyph index) utilised to reference the overall glyph. If necessary, there may be one or more character codes or characters which map to a particular glyph index. Hence, the unit of access of characters in the preferred embodiment is by glyph number. A glyph 1 is a description of the visual appearance of a character and is composed of one or more graphical objects, e.g. 2 which form a tree structure describing the appearance of the character corresponding to the glyph index. This tree structure describing the appearance of a character is sometimes referred to herein as a graphic object (GOB) tree. In FIG. 2, there is illustrated a mapping 30 of Character code 31 to corresponding glyph index 32 which is carried out utilising a Glyph Mapping Table 30.

Each graphical object e.g. 2 can contain the following information.

PRIMITIVES
    Cubic spline paths defining the shape of objects (including character paths)
    Image data in the form of pixel maps (which may or may not be in a compressed format)

Figure 3:
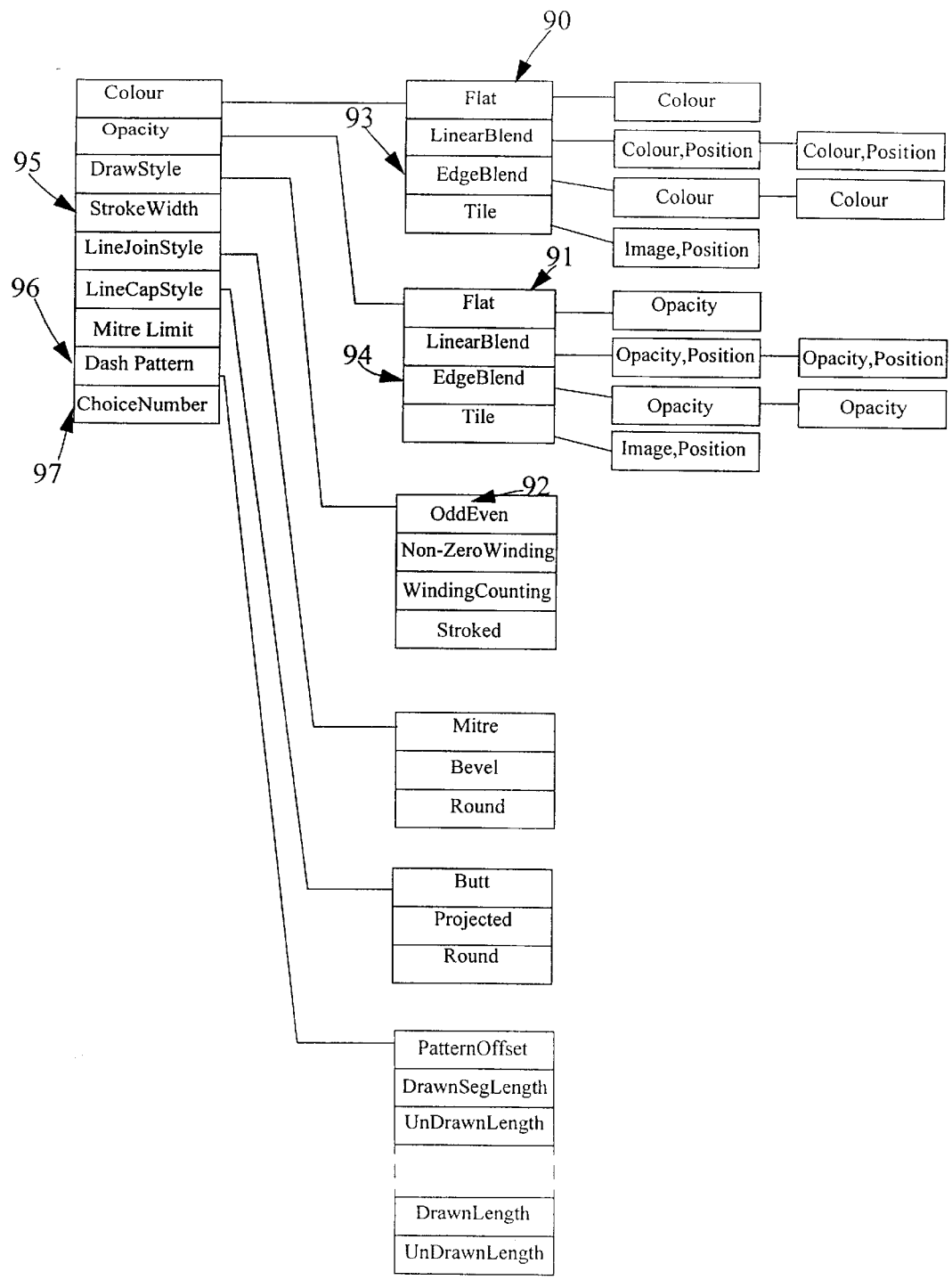
FIG. 3 illustrates a layout of the Graphics Context Attributes.

ATTRIBUTES of PRIMITIVES
Turning to FIG. 3, there is illustrated the layout of Graphic Context Attributes. These attributes can include:
    Colour and colour blend information 90;
    Opacity and opacity blend information 91;
    Edge blends of the edges of objects e.g 93,94;
    Transformation matrix to be applied to paths and images; and
    Draw style 92 and stroking parameters for paths 95,96.

OPERATORS
    Binary operators for compositing two graphics objects together (over, in, out, atop, xor, plusc, plusw). For a discussion of the operation of binary objects, reference is made to the classical article by Porter and Duff, "Compositing Digital Images", SIGGRAPH, 1984, pages 253–259.

SELECTION
    A choice of attached graphic objects based on the present environment state.

It will be evident that any primitive utilised in a graphics object can be greatly parameterised.

This means that the feature can be referred to by altering a parameter in the graphics context and having the resulting value changed when the character is used. The decision to allow objects and features to be parameterised leaves great flexibility in the hands of the font designer in the creation of complex fonts. A default value is preferably provided for each feature that is parameterised.

Returning to FIG. 1, the selection choice graphics object can form a node of the GOB tree e.g. $G0_1$ and provides a method for selecting from a group of descendant graphics objects e.g. $G0_2$, $G0_3$ provided with the font depending on a graphical context. The selection can be done in conjunction with any parameters in the graphics context. An example of the selection process is described below with reference to FIG. 6.

Parameters in primitives can be used as groups of settings to be combined to achieve a particular effect. In order to take advantage of this the font can have a section for attributes. The attribute section contains parameter settings that can be transferred to the graphics context upon a user request.

Attributes in a glyph that can be affected (see FIG. 3) can include:
colour;
opacity;
draw style;
stroke width;
line join style;
line cap style;
mitre limit;
dash pattern; and
choice number.

Figure 9:
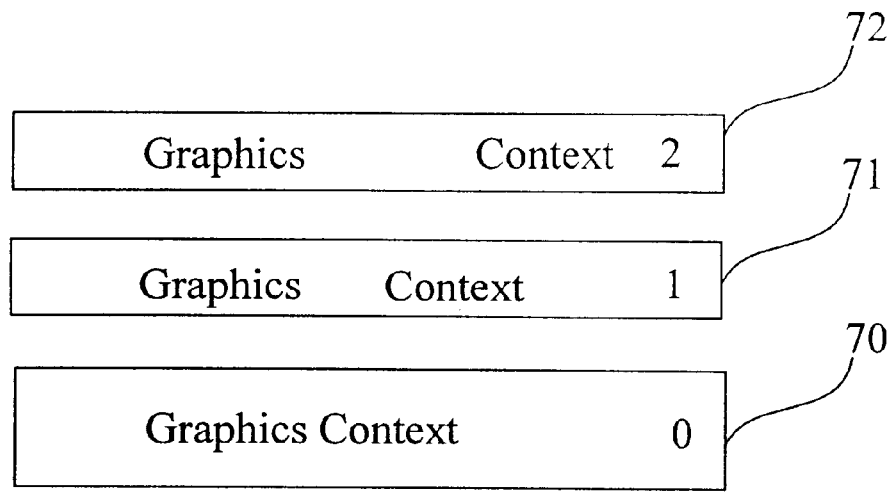
FIG. 9 illustrates multiple graphics contexts.

All colour and opacity values can preferably be parameterised across a whole font. This means that only a few colours need to be chosen to make a whole font appear colour matched and there is freedom for a font designer to use different parameters for each character if this is required. Each unique colour value to be parametered can be taken from a different graphics context number (GC number) as shown in FIG. 9.

Figure 4:
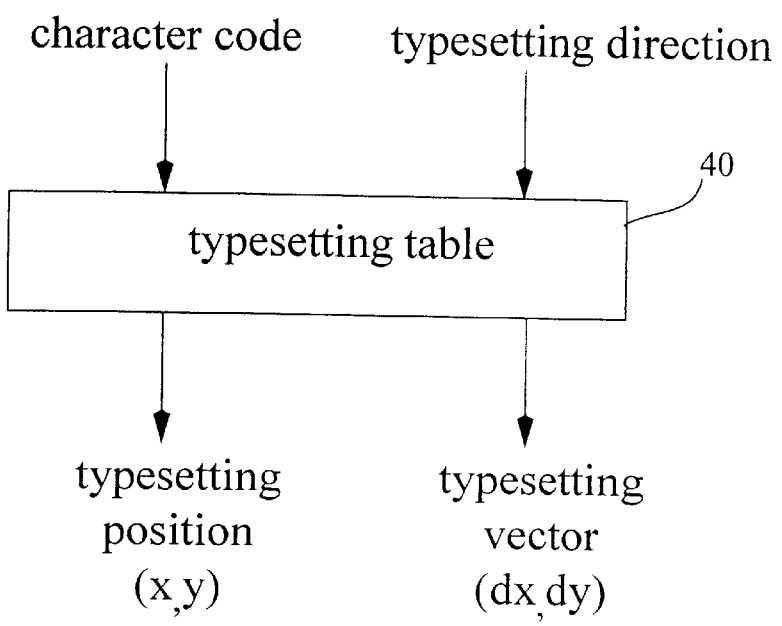
FIG. 4 illustrates the usage of typesetting information.

As shown in FIG. 4, each glyph 1 can have typesetting information 40 for its vertical and horizontal typesetting directions taken from a font file. For example, the following can be provided:
horizontal typesetting position (x, y);
horizontal typesetting vector (dx, dy);
vertical typesetting position (x, y); and
vertical typesetting vector (dx, dy).

Through the utilisation of the glyph structure 1 of FIG. 1, arbitrarily complex font structures can be created. A font can be produced which contains vastly more information than a traditional font and therefore allows for much more detail in its appearance. However, traditional font characters can also be readily stored as glyph graphical objects so there is flexibility to make them as simple or as complex as is required.

The glyph structure can therefore be adapted to be similar in operation to a conventional font so that it can be used interchangeably. The extensions to a graphics language which allow the user to control aspects of the appearance of characters in a glyph structure are purely optional.

The user essentially customises the appearance of the resulting glyph characters as desired. Each font has a default "appearance" that can be changed by manipulating customisable parameters provided by the font designer.

Figure 5:
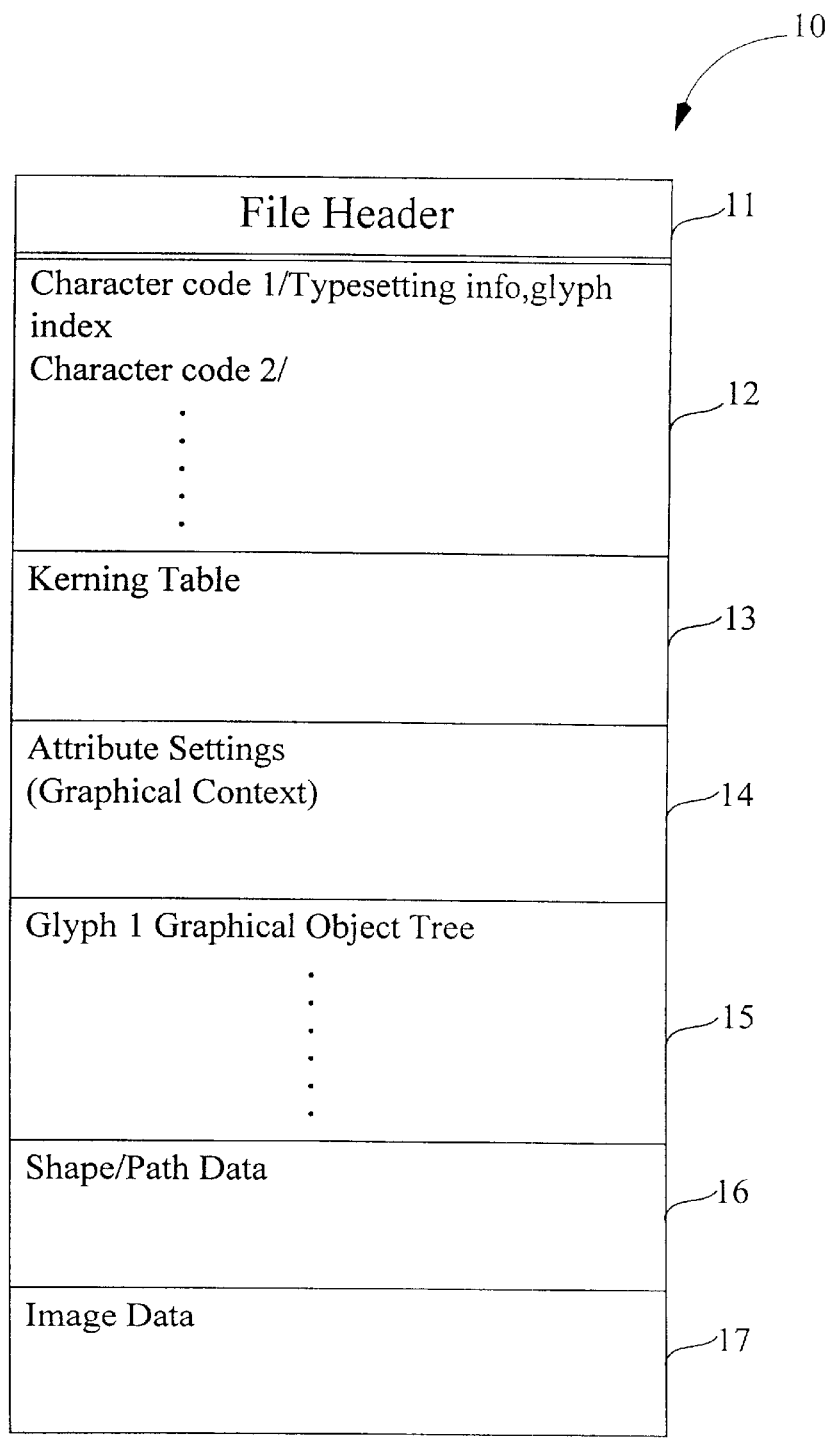
FIG. 5 illustrates the file structure for storage of fonts.

A font can therefore be created from glyphs 1 and stored in a "font file" as shown in FIG. 5 that can contain the following key elements:
font header 11;
character code, glyph index and typesetting information for each character 12;
Kerning table 13;
Graphics Context attribute settings for the Graphics Context of the Font 14;
Tree structures 15 (or Gob trees) of graphical objects for each glyph including pointers to shape 16 and image data 17;
Shape data 16; and
Image data 17.

Figure 6:
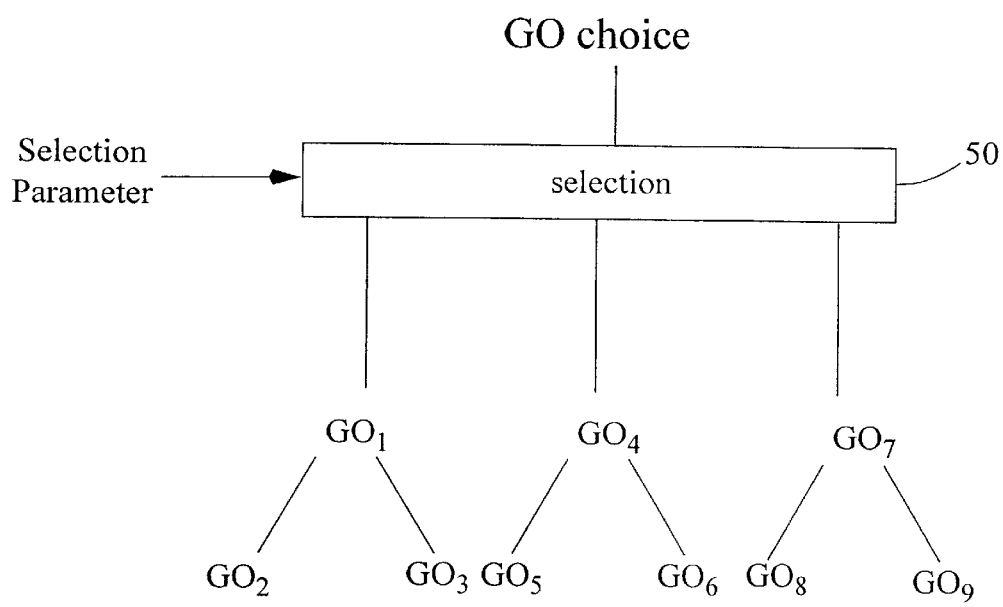
FIG. 6 illustrates the process of GOB tree selection.

The structure of a font from the user's point of view is as a collection of graphic objects 2, of which there are at least one per glyph 1. The objects can contain elements that are used in other graphic objects. Further mechanisms can be provided for altering the appearance of a graphic object by altering the Graphics Context attributes 14. As illustrated in FIG. 6, by changing the choice number and utilising the selection parameter in selection mechanism 50, it is possible to obtain a wide variety of appearances for a single character. Customisation of parameters associated with the glyph can further give the font a unique look.

Figure 7:
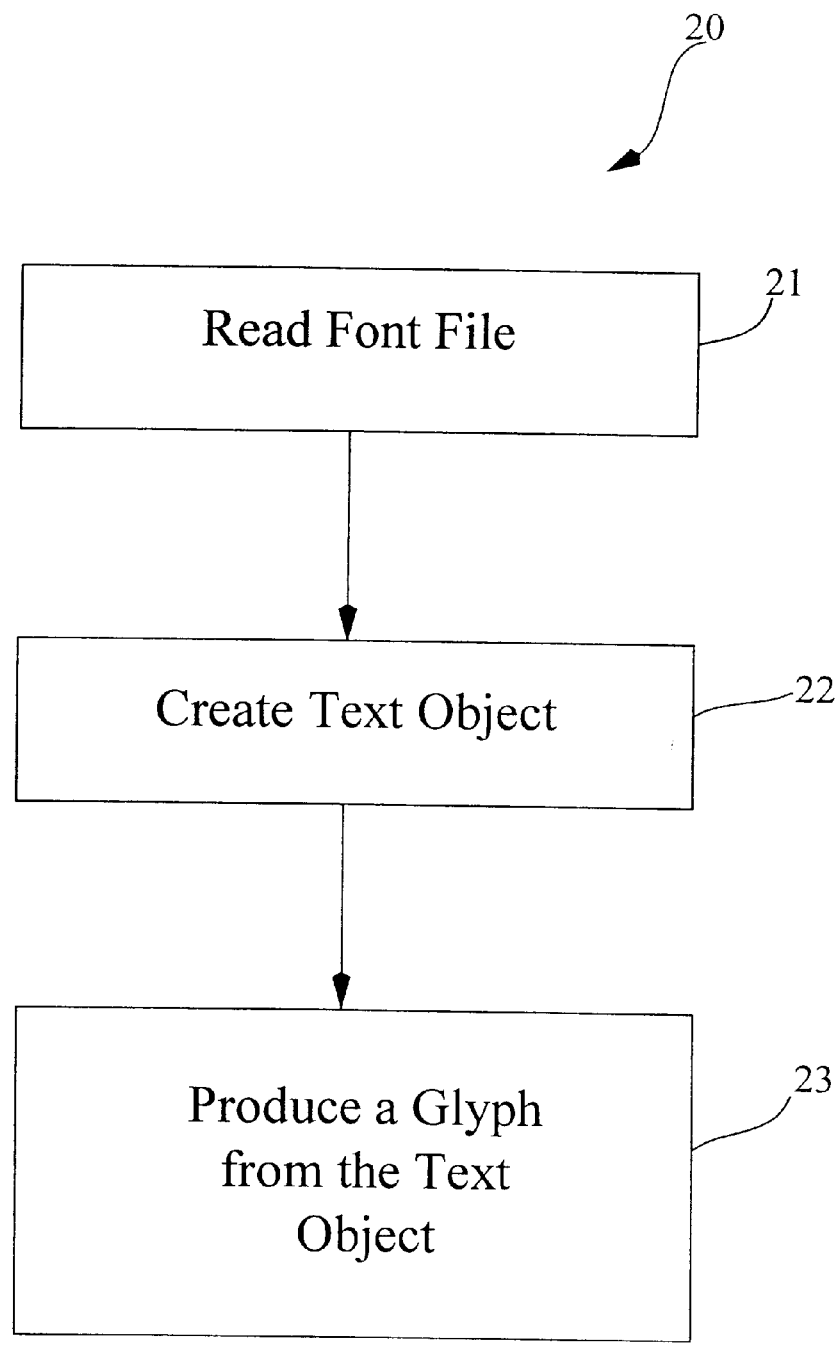
FIG. 7 illustrates a flow diagram of the steps in accessing a font character.

The process 20 undertaken to process a font character is illustrated in FIG. 7 and includes the following steps:
Read the font file 21;
Create 22 a text object referring to the correct character; and
Produce a corresponding glyph 23 from the text object.

When the font file is read it can be converted to an internal representation "cached" version) which subsequently can be utilised.

Figure 8:
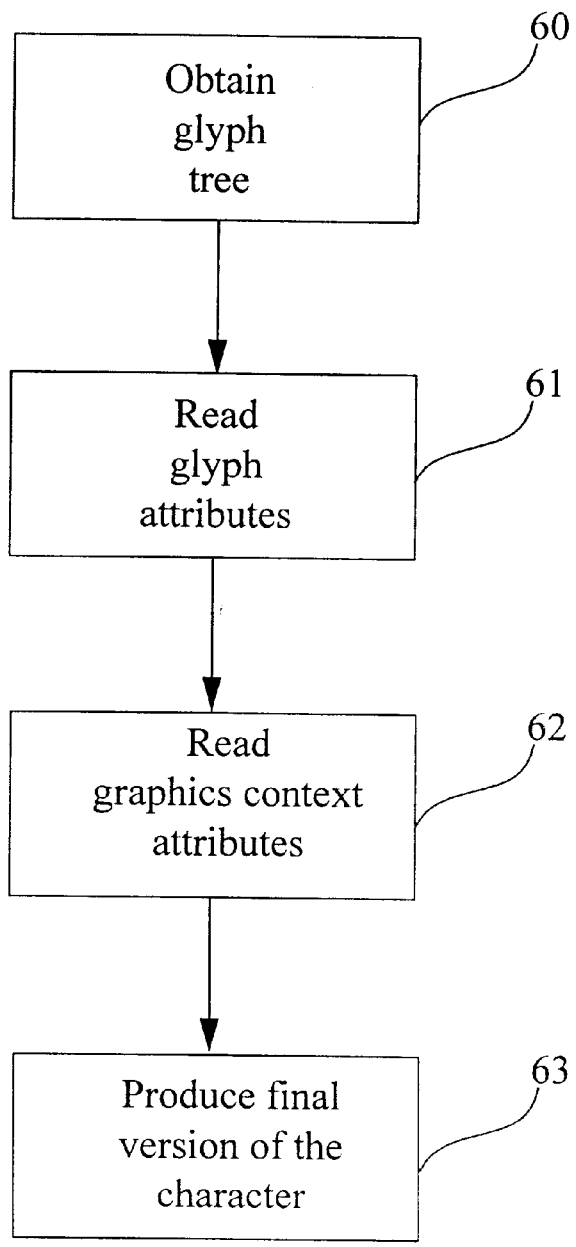
FIG. 8 illustrates the process of producing a final character.

As illustrated in FIG. 8, the ultimate representation 63 is a graphic object resulting from processing a GOB tree for each character. Graphical objects can contain fully defined instances of characters. At the stage 61, all of the aspects of the appearance of the character(s) are fixed. Conversion to a final graphical object 63 involves applying 62 the real graphics context attributes to all parameters. This stage is where the user can exercise control over the appearance of characters.

Figure 10:
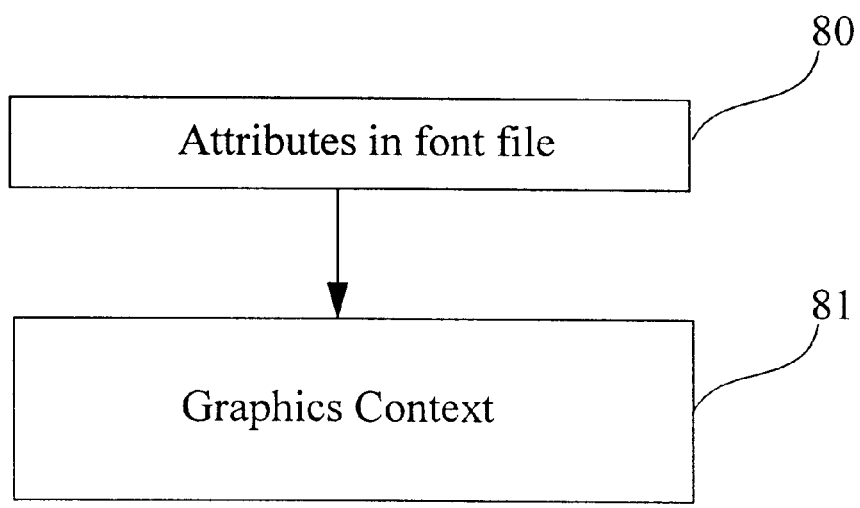
FIG. 10 illustrates setting attributes of a graphics context.

The appearance of the font can be customised by the user thereof by setting attributes in the graphics context (FIG. 3). Further, as illustrated in FIG. 9, the graphics context can be extended so that it has multiple instances 70–72, rather than just one. Each instance can be referred to by a graphics context number (GC number). These can have all of the possible attributes available for the font and can be used to customise characters in the font. The attributes at any GC number are initialised by setting them up at the base level of the graphics context (GC number 0) 70 and then copying them to the new GC number. Alternatively, the attributes can be loaded from attributes in the font file as shown in FIG. 10. A graphics context at any GC number can be copied back to the base level. For example, the following commands can be used to support graphics context numbers:

1. gc_copy("attr-name",gcnum); or
gc_copy("attr-name",gcnum1,gcnum2).

This command is used to copy an attribute (attr-name) from the graphics context number zero (70) to the number specified. In the second case the attribute is copied from gcnum2 (72) to gcnum1 (71).

2. gc_swap("attr-name",gcnum); or
gc_swap("attr-name",gcnum1,gcnum2).

This command is used to swap an attribute (attr-name) from the graphics context number zero with the number specified. In the second case the attribute is swapped between gcnum1 and gcnum2.

3. gc_load_font_defaults( ).

As illustrated in FIG. 10, the gc_load_font_defaults command is used to set the attributes in the graphics context 81 from the defaults in the font 80. In this case the attributes are typically loaded from the font file.

4. gc_clear( ).

The gc_clear command is used to clear all of the graphics contexts except for gc number 0.

Choice Number

An attribute described with reference to FIG. 3 and included in the graphics context attributes is the choice number attribute 97. The choice number attribute 97 can be read during the processing of a font character file of FIG. 10. The choice number attribute is preferably a numeric value. The commands that affect choice number can include:

gc_choice_num(option). This command sets the choice number for GC number zero 70 to the (numeric) value specified. If the value specified is zero then this can be considered to be the default font option.

option=gc_choice_num( ). This command returns the value of the choice number for GC number zero 70.

The font structure described above (which was derived from Australian Provisional Specification PO9187) provides a preferred system for creating an arbitrary complex font structure for use with the preferred embodiments of the invention. Of course, it is also possible to utilise a font character or set of font characters created using other complex image creation packages such as Photoshop, especially when macro languages are utilised within such packages.

Figure 20:
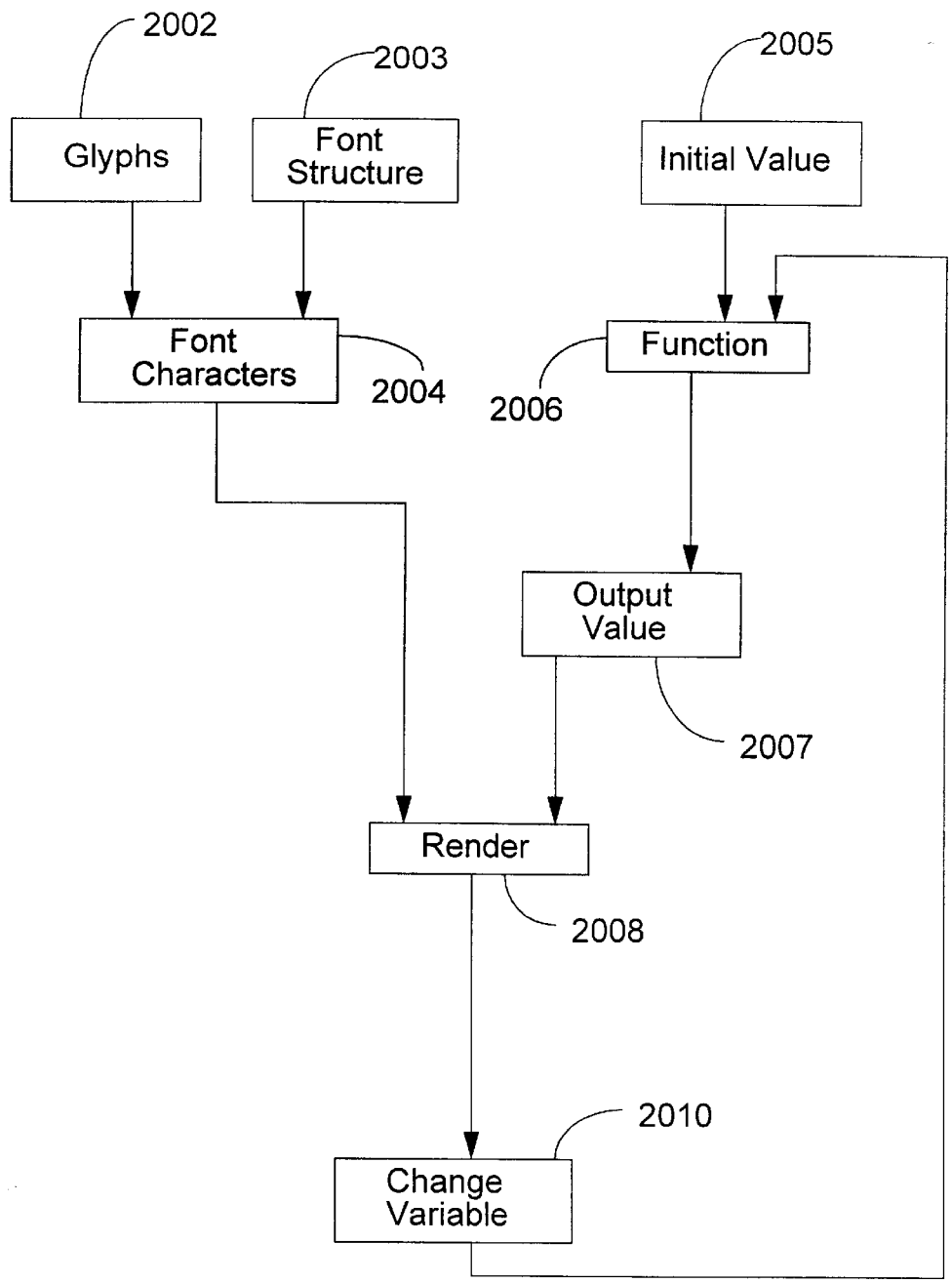
FIG. 20 is a flowchart showing steps involved in implementing a preferred embodiment of the invention.

Turning to FIG. 20, there is shown a flowchart 2000 setting out the steps involved in a preferred implementation of the present invention. Initially, glyphs 2002 and a font structure 2003 are provided, together forming one or more font characters 2004. It will be appreciated that the font structure 2003 can itself include one or more glyphs, and that the glyphs 2002 can include one or more sub-glyphs, or can be a sub-glyph itself. An initial value 2005 is provided to a function 2006, the function 2006 generating an output value 2007. The font character or characters 2004 are then rendered in step 2008 on the basis of the output value 2007.

A variable of the function 2006 for which the initial value 2005 was initially provided is then changed in step 2010 in accordance with a predetermined expression or sequence. A new output value 2007 is then generated by the function 2006, and the font character or characters 2004 are again rendered in step 2008. This process is repeated until interrupted by a user or until a predetermined time or number of iterations has passed. As discussed below, the function itself may be cyclic, which results in a cyclic animation of the font character or characters 2004. Alternatively, the expression used to change the variable in step 2010 can itself generate a cyclically changing variable value for use in function 2006. Particular preferred embodiments of the general steps set out in the flowchart 2000 are described in greater detail below.

Figure 11:
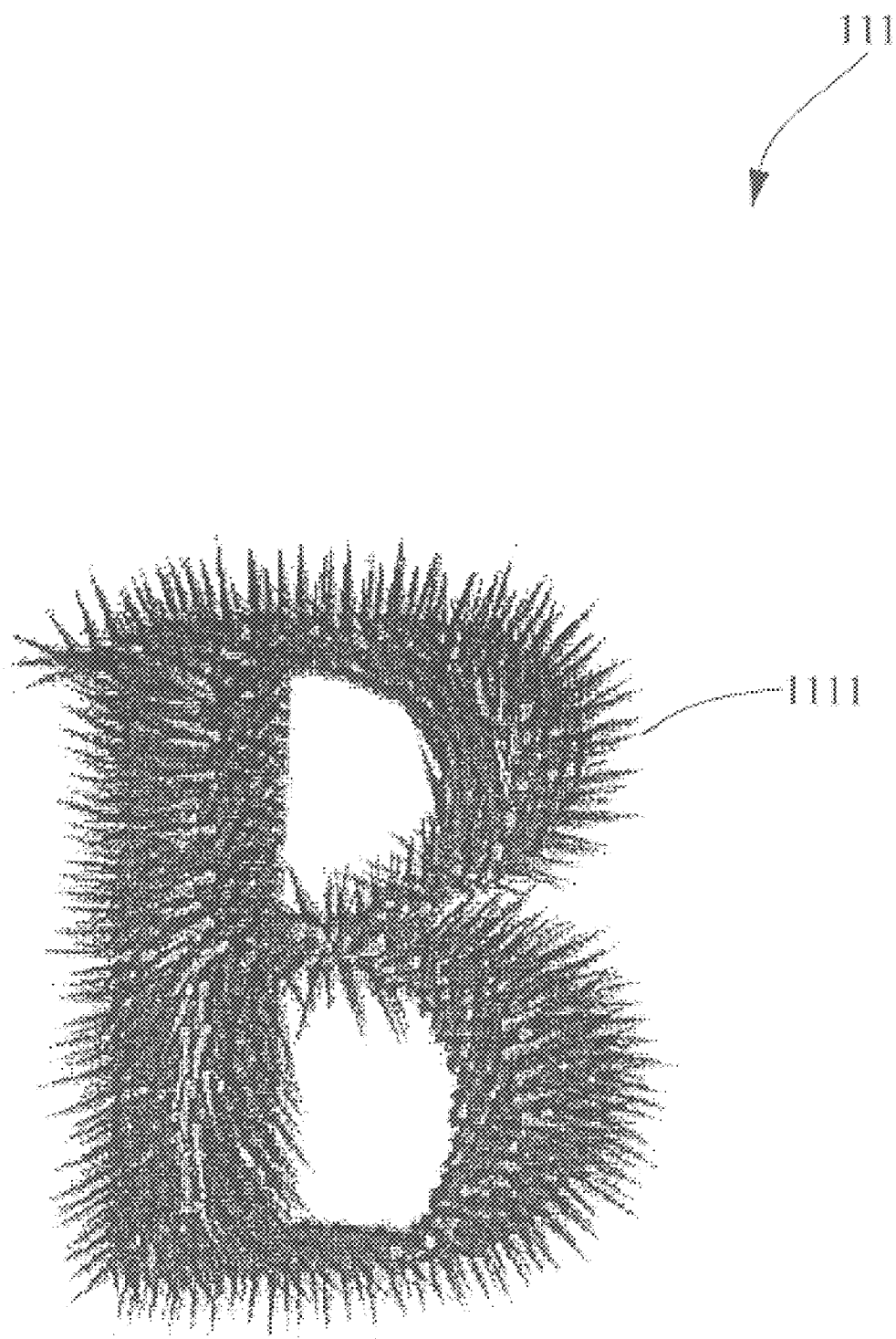
FIG. 11 illustrates an example font character having visually interesting characteristics.

Turning to FIG. 11, there is shown an example of a complex font comprising the Times Roman character font "B" 1110. The character "B" 1110 has been manipulated to include a complex image structure comprising a plurality of "hair-like" follicles 1111 that appear to a viewer to be attached to the surface of the character "B" 1110. The hair-like follicles 1111 are an example of sub-glyph elements applied to a character font. A sub-glyph element, however, is an artistic element applied to a font character, and can be algorithmically derived from outline curves of industry standard fonts or can be supplied from an external source artwork. In general, a sub-glyph is a graphical object that forms part of a glyph.

Figure 12:
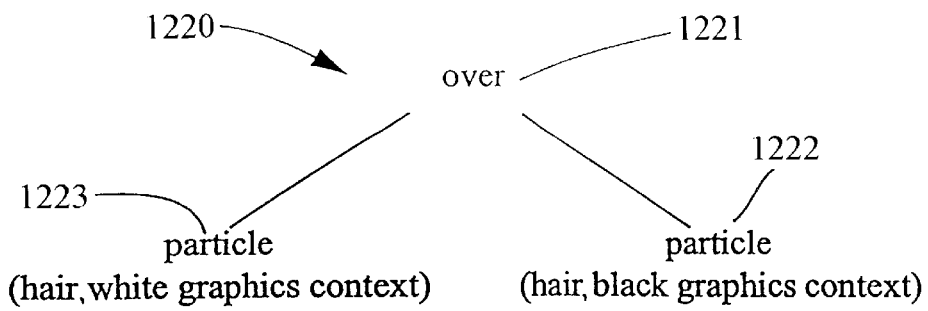
FIG. 12 illustrates an example graphics object (" GOB") tree structure for the font character of FIG. 11.

Turning to FIG. 12, there is shown a corresponding "Graphical Object Tree" or "GOB " 1220 that can be created in accordance with the principles of the aforementioned Australian specification corresponding, thereby enabling creation of the font character 1110. The expression tree 1220 consists of a number of operators having operands that, together, are composited to create a final font. In the example of FIG. 12, a single OVER operator 1221 is used to composite black particles 1222 over white particles 1223 within the bounds defined by an outline of the character "B" 1110 (FIG. 11). The black particles 1222 are the base positions of black hair-like follicles and the white particles 1223 are the base positions of white hair-like follicles. It will be noted that, in the embodiment illustrated, white hair-like follicles are positioned generally along the skeleton of the character, whilst black hair-like follicles surround them. This simulates a highlight, and provides a viewer with additional cues suggesting depth. An orientation of each follicle is determined by the value of a predetermined periodic function having a specified variable parameter; as the variable parameter is varied so too is the orientation of each follicle.

In a preferred form, the effect of changing the orientation of each follicle resembles the appearance of fur blowing in the wind.

Referring to FIG. 13, there are illustrated four different stages (labelled (a), (b), (c) and (d) respectively), in an animated sequence of the character of FIG. 1. As shown, the hair-like follicles each have an initial rotation that is determined by their position with respect to a center line or skeleton of the character "B". An additional component of the hair-like follicles rotation is defined by a predetermined periodic function, the phase of which changes for each frame of the animation. In FIGS. 13(a) to 13(d), the respective angular variations are approximately 45 degrees, 90 degrees, 45 degrees and 0 degrees (counter-clockwise). The animation is therefore cyclic with a maximum variation of plus or minus 45 degrees. The rotational angle for each follicle can be expressed as:

$$\text{Offset} = \text{amplitude} \times \sin(\text{frame factor})$$

where: "amplitude" is the maximum amount of rotation offset; and

"frame factor" is the rate at which the rotation varies for each frame or step of the animation.

It will be seen from this expression that the "frame factor" represents a variable parameter that controls the variation in appearance of the hair-like follicles (which, it will be recalled, are sub-glyphs). In the present example, "amplitude" is 45 degrees and the frame factor is 45 degrees per frame. There is also a fixed predetermined offset (or phase) of 45 degrees. It will be appreciated that this embodiment is given by way of example only, and that for visually convincing motion to be simulated, smaller angular increments per frame would be required.

Figure 14:
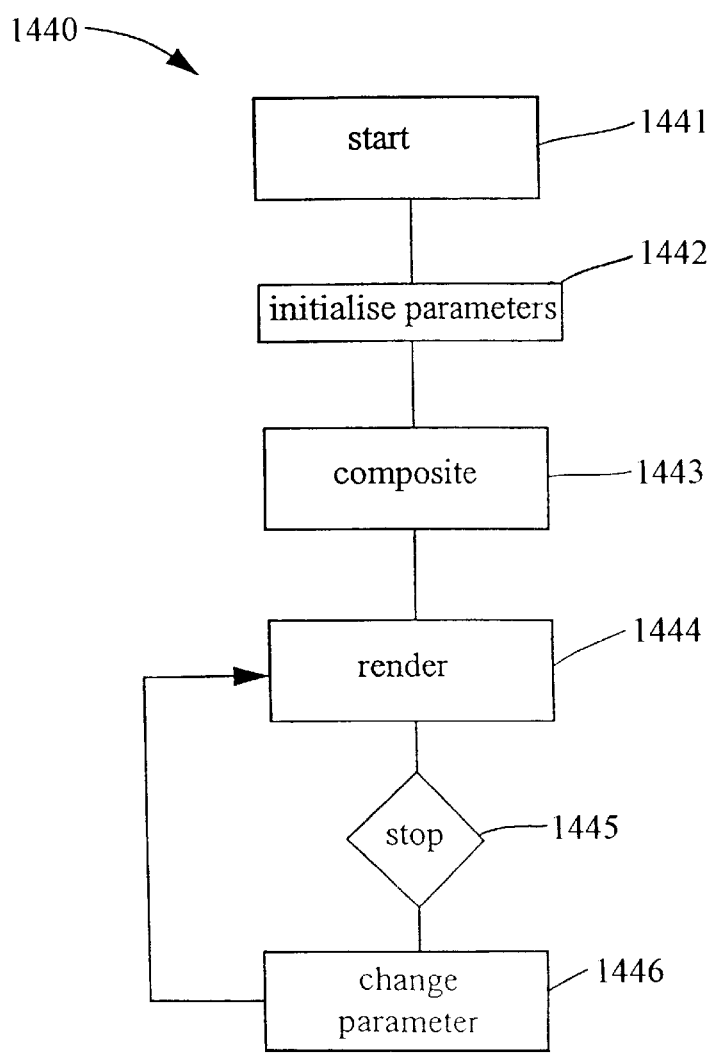
FIG. 14 represents the method steps of the animation sequence of FIG. 13.
Figure 13A:
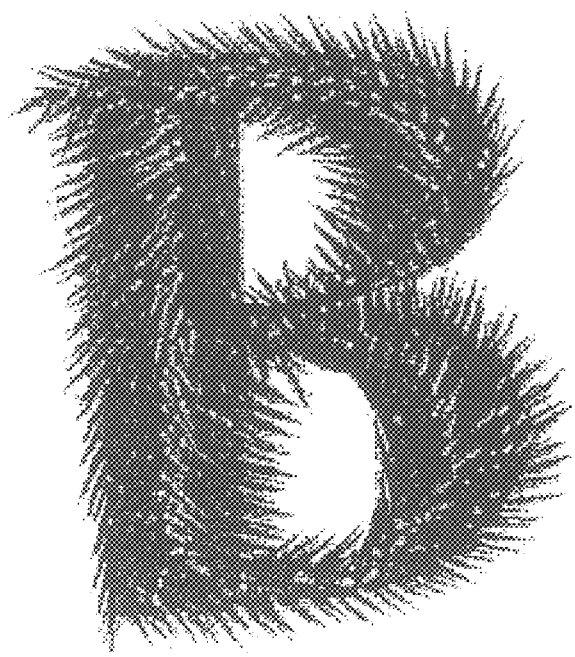
FIG. 13 illustrates an animated sequence based on the font character of FIG. 11 and the GOB of FIG. 12.
Figure 13B:
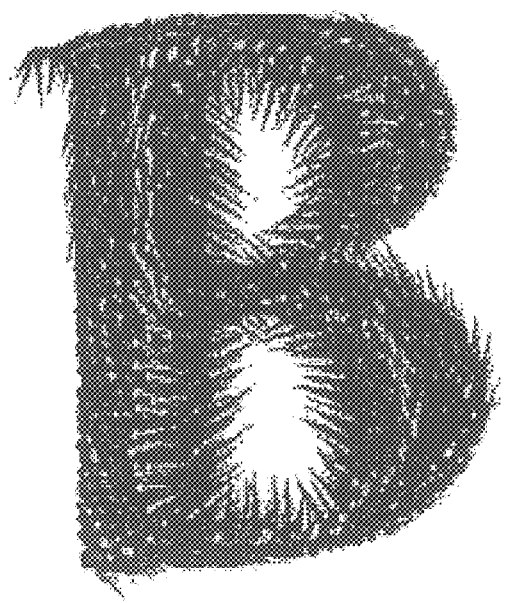
Figure 13C:
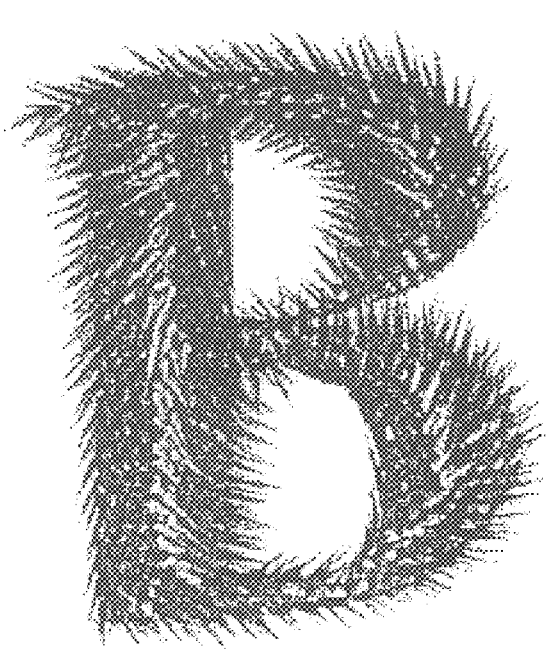
Figure 13D:
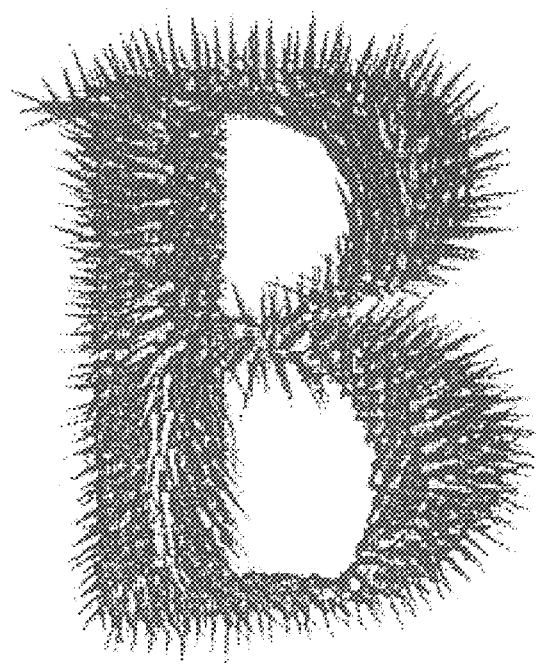
Figure 15A:
FIG. 15 illustrates another example of part of an animated sequence according to the invention.
Figure 15B:
Figure 15C:
Figure 15D:
Figure 16A:
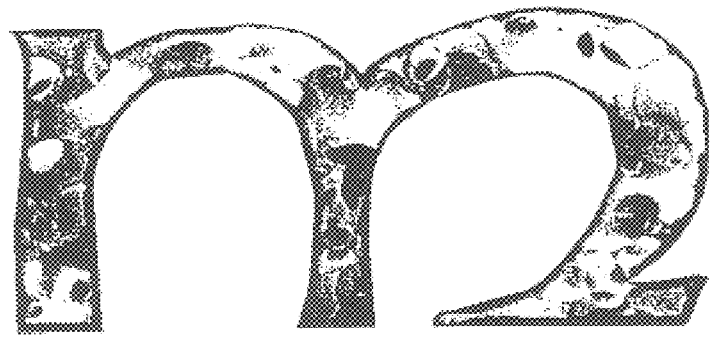
FIG. 16 illustrates yet another example of part of an animated sequence according to the invention.
Figure 16B:
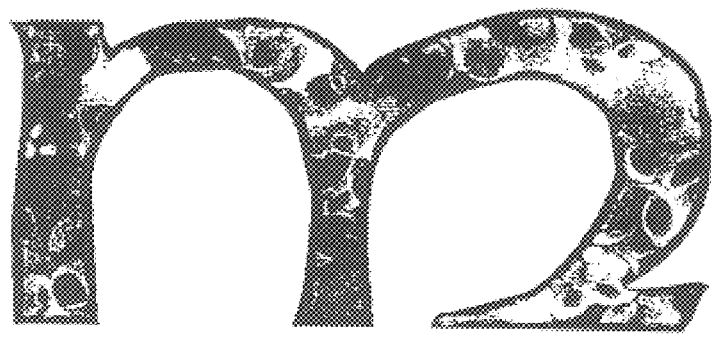
Figure 16C:
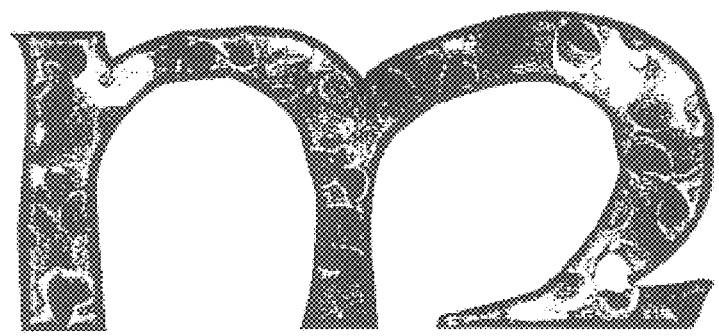
Figure 16D:
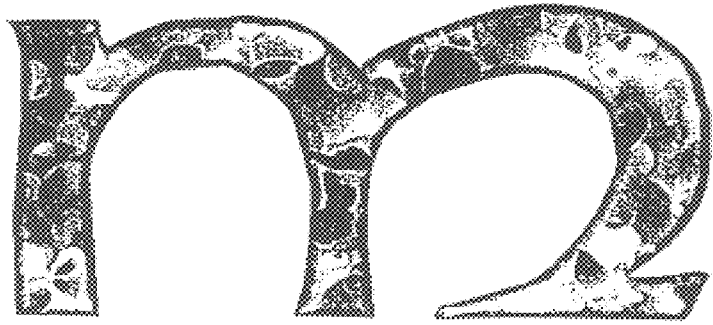
Figure 17A:
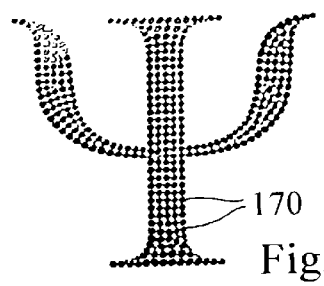
FIG. 17 illustrates one example of part of an indirect state-to-state animated sequence in accordance with the invention.
Figure 17B:
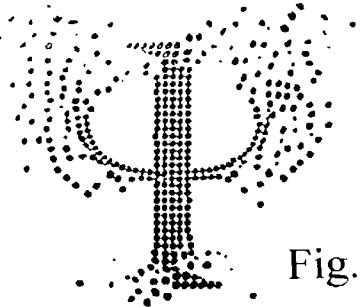
Figure 17C:
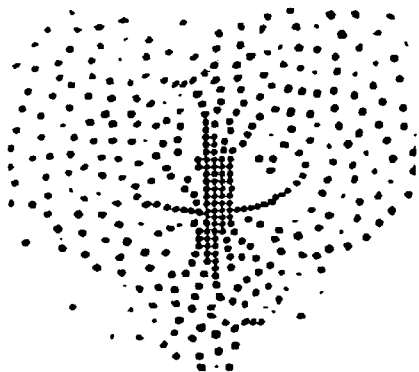
Figure 17D:
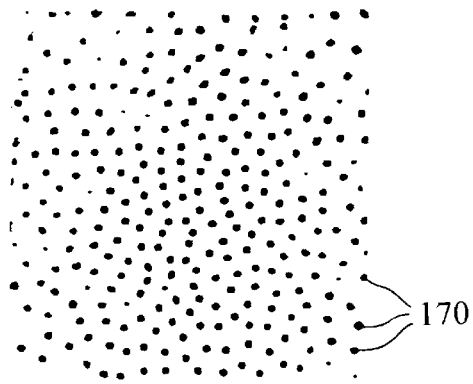
Figure 17E:
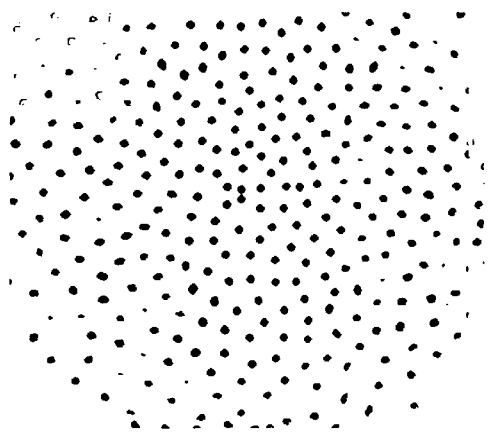
Figure 17F:
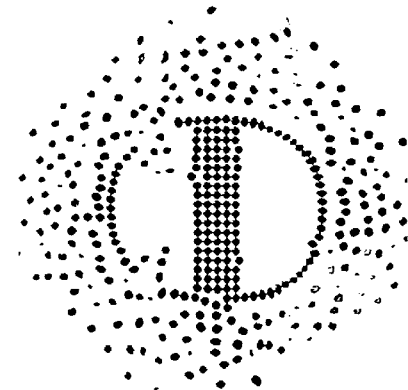
Figure 17G:
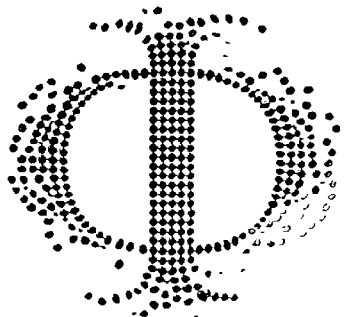
Figure 17H:
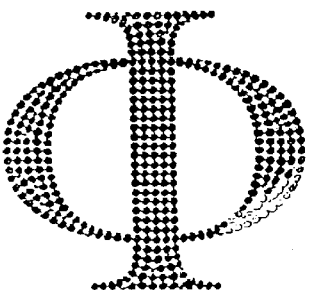

A flow-chart of the steps of the rendering process of the animated sequence represented in FIG. 13 is shown in FIG. 14. After the start 1441 of the rendering process 1440 the phase parameter, for each follicle, is initialised 1442 and the follicle is composited 1443 in accordance with the GOB tree of FIG. 12. The composited 1443 image is rendered 1444 to an output device. In a next step 1445 a decision is made as to whether or not the process 1440 should stop. A "yes" decision at this step 1445 can be the result of, for example, a user prompt to stop, a predetermined interrupt or a time limit having been reached. A "no" decision allows the process 1440 to continue to a next step 1446 where the phase parameter I is incremented and the process 1440 is looped back to the render step 1444 to output a next stage of the image sequence.

In a preferred form, each frame of an animation sequence can be composited and pre-rendered to memory prior to display. For example an animation sequence can be composited, rendered and converted to an Audio-Video Interleaved "AVI" file format, which can be viewed by an application such as Microsoft Media Player available from the Microsoft Corporation. However, the compositing and rendering can also be performed in real time, to produce an animated sequence "on the fly", without departing from the scope or spirit of the invention.

Turning now to FIG. 15, there is shown an alternative embodiment of the present invention. FIG. 15 shows four stages, again labelled (a) to (d) respectively, of an animated ripple effect applied to a text string "ripple". In this example the animation effect is applied to a portion of the outline of each character of a font known as "Arial" and the string of characters that make up the word "ripple" have been selected.

The outline of a font can be represented by a series of functions, for example in terms of Bezier Splines. In the example of FIG. 15 a number of splines in the lower portion of each character are modified by a wave-like periodic function. The wave-like periodic function has at least one phase parameter for controlling the ripple distortion of the portion of each character where the ripple effect is applied. As previously described with reference to FIG. 14, the phase parameters are changed with time and the images created are rendered to an output device in real time to simulate the animated effect. In the present example, the amplitude of the periodic function varies in a sinusoidal fashion on the basis of vertical position with respect to the text. In the top half of the text, no effect is applied. In contrast, in the bottom portion of the text, the amplitude of a horizontally oscillating sine wave increases from zero (at the center of the text) to a value approximately half of the vertical size of the characters (at the lowest point of the text). The phase also changes towards the lower portion of each character. When animated, the simulated effect is similar to the ripples or waves on the surface of a body of water. It should be pointed out that, in the example illustrated, an opacity blend has also been applied to the characters from about half-way down their height. This helps suggest a realistic water rippling effect, but is optional. A different effect can be achieved by animating the amplitude of the periodic function instead of (or as well as) the phase.

Turning now to FIG. 16 there is shown another embodiment of the invention including a plurality of overlapping shapes having associated colour and/or opacity. The opacity and/or colour of each of the overlapping shapes is varied to provide an animated Kaleidoscope effect within an outline of a character "m". Each shape on the character "m" has an associated opacity index.

An animated Kaleidoscope effect on the character "m" is achieved by assigning a predetermined function, having an output dependent on a variable parameter, to the opacity index. The variable parameter of the function is then varied in a cyclic manner over time. In the example shown in FIG. 16, a cone-shaped opacity function is applied to each of the overlapping shapes at a plurality of locations on the character "m". The radius of the base of the cone is a parameter of the function and is varied over time to produce a Kaleidoscope effect.

It will be appreciated that the embodiments of FIG. 14 to FIG. 16 are only shown for illustrative purposes and are not to be taken as exhaustive limitations on the invention. Furthermore, where multiple frames are shown, they do not merely represent a selection of key frames that are used in the interpolation of intermediate frames of an animated sequence. Rather, they represent frames extracted from the animated sequence to explain the particular embodiments to which they respectively relate.

The method of the preferred embodiment allows for an automated generation of continuous cyclic animation for industry standard typefaces (for example, Courier and Times New Roman), as well as proprietary fonts.

The animation of characters described in the preferred embodiment falls within three broad categories:

1. animation of sub-glyph elements applied to a character;
2. animation of character outlines (or a portion thereof);
3. animation of characteristic features of a character such as colour, opacity or texture (apparent texture), and includes animation of substantially similar characteristic features of a region outside a character outline.

The example described with reference to FIG. 13 falls within the scope of category 1, whilst the example described with reference to FIG. 15 falls within the scope of category 2. The example of FIG. 16 falls within category 3.

Animations in category 1 can further include features such as: cyclic transformations applied to sub-glyph elements such as the rotation of the hair like follicle; cyclic expanding or shrinking of packed components (e.g. particle packing); and scattering of sub-glyph elements.

Animations in category 2 can further include features such as: transformations such as scaling and rotation of part or all of the character outline; and cyclic perturbation of a character outline (such as wave rippling on part of the outline of a character).

Category 3 also includes effects like molten lava textures, wood grain textures, mosaic tile colouring, and a collage of colours applied to a character.

In addition to the three broad categories described there are two types of classifications, which all three categories fall under:

1. direct state-to-state animation (hereinafter "type 1 animation"); and
2. indirect state-to-state animation (hereinafter "type 2 animation").

In type 1 animation, a character subject to one of the broad three categories remains substantially the same character. For example, in the various stages of the animation sequence of FIG. 13 the character "B" is recognisably the character "B". Similarly, the characters in FIG. 15 of the word "ripple" and the character "m" in FIG. 16 remain recognisably the same characters, even though a different animation effect is noticeable at each stage before the animation effect returns to a full cycle. The examples previously described with reference to FIG. 13, FIG. 15 and FIG. 16 can all be defined as type 1 animation.

Turning now to FIG. 17 there are shown eight stages, labelled (a) to (h), of an example of a type 2 animation using indirect state-to-state transition. The eight stages represent half of a cyclic animation during which a character returns to its original shape after changing into a different character. In particular, the animation sequence of FIG. 17 shows an upper case Greek character "psi" ($\psi$) constructed from a plurality of pebble-like tiles 170 (stage (a)) that explode into a seemingly random arrangement of tiles 170 (stage (d)), and subsequently implode to produce a lower case Greek character "phi" ($\Phi$) (stage (h)). FIG. 17 represents substantially half a cycle of the animation sequence. To complete a full cycle the character $\Phi$ explodes and subsequently implodes back to the character $\psi$ in substantially the reverse order of the stages of FIG. 17. Preferably, between stage (d) and stage (e) there is a mapping transformation involved to re-arrange the pebble-like tiles to facilitate the implosion to the character $\Phi$.

Accordingly, it will be appreciated that a type 2 animation is one in which an original image (usually a character) is transformed over one cycle to the same image (the same character) via one or more intermediate images, not all of which in substance resemble the original image. For example, the image of a character ψ (original image) is transformed over one cycle to the character ψ (the same image), via intermediate images, which do not resemble the character ψ. The intermediate images include an image of the character Φ and at least one image of a random arrangement of tiles 170 (stages (d) and (e) of FIG. 17).

Figure 19A:
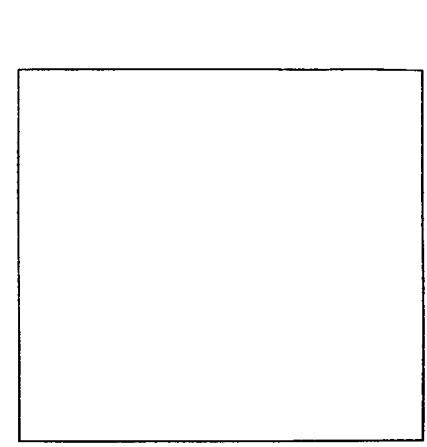
FIGS. 19A to 19D are illustrations of a sequence generated by a further preferred form of the invention.
Figure 19B:
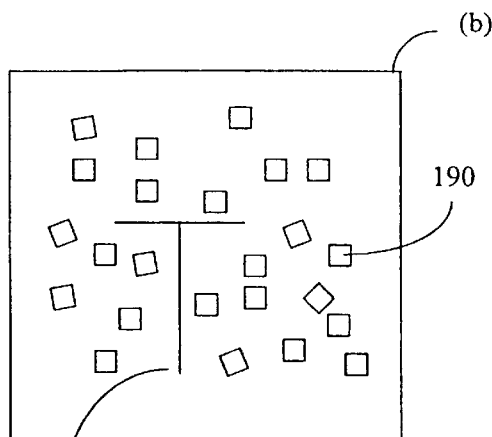
Figure 19C:
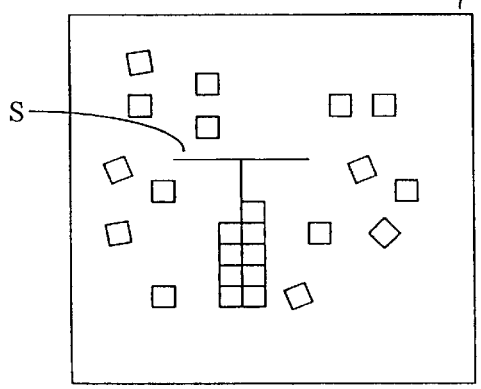
Figure 19D:
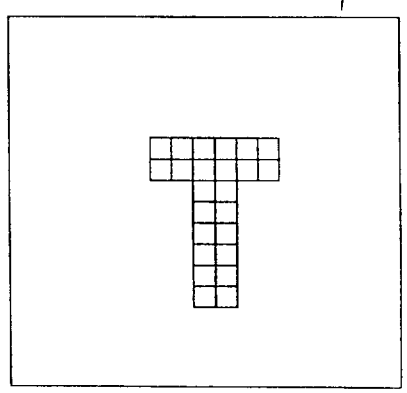

Another preferred embodiment is shown in FIG. 19, in which a plurality of apparently randomly scattered tiles 1901 (FIG. 19B) coalesce over a number of intermediate frames to form a completed "T" text character 1902 in FIG. 19D. Initially, in FIG. 19A, a blank background page 1905 is provided. A skeleton 1904 is then provided, as shown in FIG. 19B, and the tiles 1901 are disposed around the skeleton 1904 in a seemingly random arrangement. It will be appreciated that the arrangement can be based on some pseudo-randomising expression, or can be based on one or more predetermined arrangement. Alternatively, the arrangement can take the form of a regular or at least recognisable pattern.

FIG. 19C represents one of a number of intermediate frames in which each of the tiles 1901 moves from its original position towards a predetermined position on the skeleton 1904. Each tile 1901 can either move directly to its corresponding position, or can take a more indirect route which can include rotation about the skeleton 1904 or oscillation with respect thereto. One or more of the individual tiles can also be made to rotate as it moves towards its predetermined position on the skeleton 1904.

In the final frame of FIG. 19D, all of the tiles have reached their corresponding predetermined positions, thereby forming the text character "T".

In type 1 animation, an image (usually a character) is recognisably the same throughout each frame of an animation sequence even though an effect applied may vary from frame to frame.

Both types of animations (type 1 and type 2) preferably obey the following constraints:
(a) S(0)=S(t) where S represents a state of animation (ie a frame in a sequence), and t is a time at an integer multiple of one cycle; and
(b) there is a small change in animation effect between adjacent frames of an animation sequence such that the animation effect appears relatively smooth and preferably continuous over each cycle.

As previously described, the preferred form of displaying an animated sequence is to composite and render the animation sequence to a file in memory (eg hard disk drive). The animation sequence can then be displayed from the file in memory. For example, the animation sequence can be generated and then stored as an AVI file stored on a hard disk drive for subsequent reproduction.

In addition to the pre-rendered file, each animated character font is typically stored in a font file format which is then converted to a pre-rendered file, or rendered on the fly, before displaying the animated sequence on a display device. Preferably, the font file format is stored in one or more files in non-volatile memory such as a hard disk drive or a read/write compact disk (CD-RW) and corresponding disk drive. Further, an animated font (that is, a set of animated characters in font file format) can be stored in non-volatile memory such as a compact disc read only memory (CD-ROM), CD-RW or a hard disk drive. The file can be stored in one or more files and selectively accessed for rendering to a display device.

In storing animation sequences into one or more files, the use of one of the following font file formats is preferred:
1. A TrueType Font (TTF) format comprising a series of frames for an animated sequence of a single character (symbol) is stored in a single file and indexed by an integer code. Each frame of the single file is randomly accessed by its corresponding index. For example, in a series of 32 frames of an animation sequence, a third frame in the series may have the integer code 3 and the tenth frame the integer code 10. To display only the third and tenth frame, software function calls using integer code 3 and 10 can be used to display, on a display device, the third and tenth frame respectively without the need to display other frames of the 32 frames sequence.
2. A TrueType Collection (TTC) format comprising a plurality of TTFs, each TTF being stored in a single file comprising substantially all character symbols of each TTF. A TTC is therefore a collection of TTFs, which provide an animation sequence for each character symbol in the TTF. For example: a first TTF file, of a TTC, is a one frame per character of the alphabet A-Z and is a first frame of an animation sequence; a second TTF file contains a second frame of each character for the animation sequence etc. Each frame of a TTF file is accessed by an integer code in a manner analogous to the integer access of an American Standard Code for Information Interchange (ASCII) file.
3. A "Glorious Font" format (GLF) which contains a mechanism by which multiple forms of each character can be stored in a single file, and randomly chosen when rendering. In one embodiment a complete animation sequence for every character in a font is stored in a single file. In the preferred embodiment the font file format of the single file is described in terms of a complex font structure such as that described in Australian Provisional Patent Specification PO9187 set out above.

TTF files typically comprise a font whose glyphs are stored as a set of lines, curves, curve commands and hints. A computer software program or operating system uses the lines, curves, commands and hints to define the outline of a glyph's bitmap, in a manner well know to those skilled in the art. The hints are used to adjust the length of the lines and shapes of the curves that are based on the amount of scaling used to reduce or increase the size of the bitmap.

A TTC is a mechanism of delivering multiple TrueType Fonts in a single file structure. TrueType Collections provide useful advantages where two or more different character fonts have glyphs in common. At least one advantage of such an arrangement is a saving of file space required to store such fonts. For example, a group of Japanese character fonts can each have a predetermined design for the "Kana" character symbol glyphs, but share identical designs for glyphs or "Kanji" character symbols. In single TTF files, one way of including the common Kanji glyphs is to copy common glyph data into each font file. Since Kanji character symbols typically represent more data than the Kana character symbols, the result is relatively wasteful duplication of glyph data. In contrast, a TrueType Collection provides a space saving mechanism since glyphs that are common to a group of TTF files are stored only once within the relevant TTC.

It will be evident to those skilled in the art that character fonts can also be made to appear animated by animating a background region surrounding the characters of the font. For example a character can be made to look like it is flying by cyclically moving a set of clouds across a display device also displaying the character. Another example of such animation includes a background region of a character including a collection of tiles or tiled images that are cyclically (automatically) manipulated, on a display device, to leave a void region in the shape of the character.

Turning now to FIGS. 19(a) to 19(d), there are shown four stages labelled (a) to (d) of another example of a type 2 animation going from an initial state to a steady state. It will be appreciated that in a real application, there will be many more stages between stages (b) and (d). However, for the sake of simplicity, the majority of the intermediate stages have been omitted.

The animation shown in FIGS. 19(a) to (d) is a half cycle of a periodic animation sequence, and differs from the previous periodic animation described with reference to FIG. 17 in that it stops at a final steady state. In particular, the animation sequence of FIG. 19 shows an initial state (a), which is in this case a blank display (or other static display). The next sequence of FIG. 19 shows the start state (b), which displays a seemingly random arrangement of tiles 190. The next sequence of FIG. 19 shows an intermediate state (c). The last sequence of FIG. 19 shows the final steady state (d), where the tiles have arranged themselves around a skeleton S of the character "T". The animation sequence then stops at this final steady state (d). In this way, the tiles move to form the character "T".

Each tile 190 is provided with a function, preferably a sequential mapping transformation that involves the re-arrangement of the tiles. This mapping transformation is preferably a function of a parameter, such as time, enabling the animation to proceed from the initial state to the final state.

Preferably, the user inputs the desired characters for display and the method of FIG. 19 derives the skeletons S of the characters using a stroke extraction process. Whilst the present embodiment utilises tiles 190, other, more unusual, sub-glyphs can be used to construct the final state of the character or characters. For example, caterpillars could be used as sub-glyphs of the character. In that case (not shown), during the animation sequence the caterpillars move from their random positions to a position surrounding the skeleton S of the character(s).

In another embodiment, the start stage can be state (d) and final steady state can be state (b). In this way, the characters appear to explode. In another possible animation sequence, the caterpillars can move from random positions to form words then explode and then return to form another different set of words.

Preferably, the method of FIG. 19 provides a font structure representing font characters. Typically, the outline of a font can be represented by a series of functions, such as Bezier Splines. Alternatively, the input can be a set of curves drawn by the user instead of font characters. These user drawn curves can then be animated as in the preferred method.

Preferred embodiments of the invention including those described with reference to FIG. 11 to FIG. 17 and FIG. 19, can be practiced using a conventional general-purpose computer, such as that shown in FIG. 18. In this regard, preferred embodiments are implemented as software executed on the computer.

Figure 18:
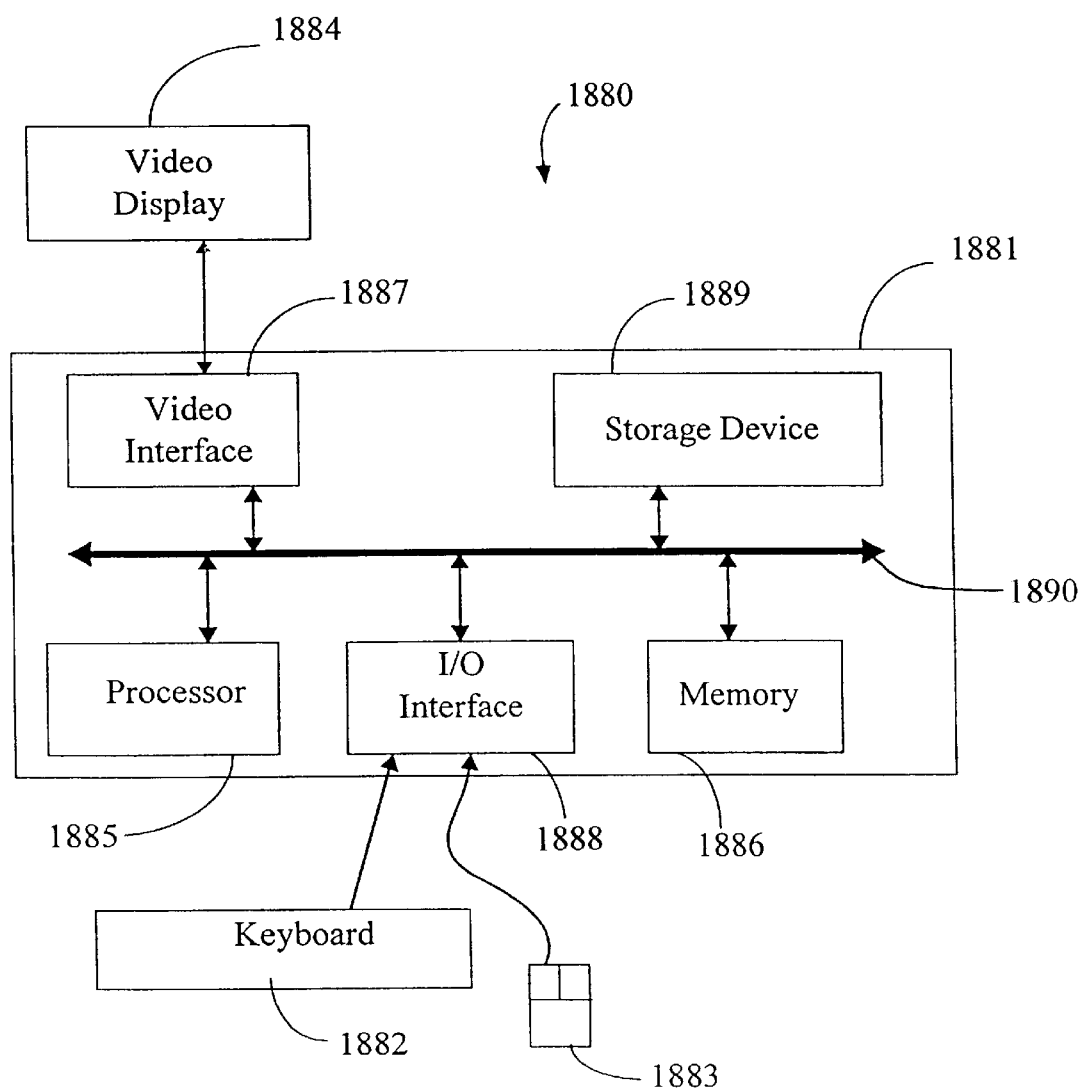
FIG. 18 is an apparatus upon which a preferred embodiment of the invention can be practiced.

Referring to FIG. 18, a computer system 1880 comprises a computer 1881, input devices 1882, 1883 and a display device 1884. The computer 1881 comprises at least one processor unit 1885, a memory unit 1886 which typically includes random access memory (RAM) and read only memory (ROM), and input/output (I/O) interfaces including a keyboard and mouse interface 1888. The storage device 1889 can include one or more of the following devices: a floppy disk, a hard disk drive, a CD-ROM drive or similar non-volatile storage devices as are well known to those skilled in the art. The various components 1885 to 1889 of the computer 1881 communicate via an interconnected bus 1890 in a manner that results in operation of the computer system 1880 in a manner known to those in the relevant art. Examples of computers on which the embodiments can be practised include IBM-PC/ATs and compatibles, and Sun Sparcstations.

It will be appreciated that the invention can also be embodied in an apparatus in the form of a computer programmed to implement an embodiment of the invention. Similarly, a further embodiment of the invention takes the form of a computer software medium that stores data or software procedures for implementing the steps of any specific embodiment of the invention falling within the scope of the appended claims.

It will be appreciated by those skilled in the art that numerous variations and modifications can be made to the specific embodiments herein described without departing from the spirit or scope of the invention. The embodiments presented should, therefore, be considered in all respects illustrative and not restrictive in any way.

The claims defining the invention are as follows:

1. A method of creating an animated font character based on an initial non-animated font character, the method including the steps of:
   (a) providing a glyph representative of at least one aspect of the non-animated font character;
   (b) applying a first predetermined function to the glyph, thereby to generate a modified glyph;
   (c) providing a second predetermined function for generating an output dependent upon a value of a variable parameter, the variable parameter having an initial value, wherein a visual appearance of the modified glyph is based at least partly on the output of said second predetermined function;
   (d) rendering said modified glyph;
   (e) altering the value of the variable parameter;
   (f) repeating steps (d) and (e), thereby to generate a plurality of rendered modified glyphs that together define an animated font character; and
   (g) displaying the animated font character on a display or storing it in memory for subsequent reproduction.

2. A method according to claim 1, wherein the modified glyph includes at least one sub-glyph providing a contribution to the visual appearance of the modified glyph, the contribution of the sub-glyph being based at least partly on the output of said second predetermined function.

3. A method according to claim 1, wherein step (c) includes the substep of providing a predetermined function that results in an output that varies in a cyclic fashion as the value of said variable parameter is altered.

4. A method according to claim 1, wherein step (e) includes the substep of linearly increasing the value of said variable parameter, and periodically resetting the value to the initial value.

5. A method according to claim 4, wherein the second predetermined function is selected to provide a sinusoidal output in response to a linearly increasing and resetting value of said variable parameter.

6. A method according to claim 1, wherein step (e) includes the substep of altering the value of said variable parameter such that the output of the second predetermined function varies in a cyclic fashion.

7. A method according to claim 5, wherein step (e) includes the substep of altering the value of said variable parameter in accordance with a sinusoidal function.

8. A method according to claim 1, wherein the sub-glyph includes visual features applied to the glop.

9. A method according to claim 2, wherein the glyph includes a boundary of the non-animated font character.

10. A method according to claim 9, wherein step (b) includes the substeps of:
(i) defining a plurality of spaced apart reference points within the boundary of the non-animated font character; and
(ii) applying a sub-glyph to each of the spaced apart reference points, the visual contribution of the sub-glyph being based at least partly on the output of said second predetermined function.

11. A method according to claim 10, wherein the sub-glyph applied to each of the reference points takes the form of a follicle.

12. A method according to claim 11, wherein the visible contribution of the follicles is based on an angular disposition of each one individually, the angular disposition of each follicle over time being based on the output of the second predetermined function.

13. A method according to claim 12 wherein each follicle has associated with it an angular phase component, such that the relative angular disposition of at least some of the follicles is different to that of at least some of the other follicles.

14. A method according to claim 9, wherein step (b) includes the substeps of:
defining a plurality of spaced apart reference points within the boundary of the non-animated font character; and
triangulating the points to define a plurality of adjacent polygons within the boundary, the plurality of adjacent polygons defining sub-glyphs of the modified glop; wherein the output of the second predetermined function defines a position of each of the polygons with respect to an area or point associated with the boundary.

15. A method according to claim 14, wherein, as the variable parameter is varied over time, the polygons move from each other in directions substantially away from a central area or point associated with the boundary of the font character.

16. A method according to claim 15, wherein, as the variable is further varied over time, the polygons cease moving from each other and commence moving towards each other until they are again adjacent each other, the resultant adjacent polygons forming a secondary font character.

17. A method according to claim 16, wherein the secondary font character is distinct from the original font character.

18. A method according to claim 17, wherein, as the variable is further varied over time, the polygons again move away from each other and subsequently move together to form a font character, the font character being either the original font character or some other font character.

19. A method according to claim 1, wherein the glyph includes a boundary of the non-animated font character.

20. A method according to claim 19, wherein step (b) includes the substep of applying a texture, in the form of a sub-glyph, to the area within the boundary.

21. A method according to claim 20, wherein step (b) includes the sub-step of positioning a plurality of overlapping shape elements, each of which has an associated opacity, within the boundary, the texture being generated by compositing the overlapping shape elements.

22. A method according to claim 21, wherein the opacity of each of the shape elements is not constant over a surface of that shape element.

23. A method according to claim 22, wherein each shape element has a center and a periphery, and an opacity distribution of each shape element takes the form of a cone or pyramid, such that the opacity of each shape element is greater at its center than at its periphery.

24. A method according to claim 20, wherein each of the shape elements has a colour associated with it, the overlapping colours being composited to contribute to an appearance of the texture.

25. A method according to claim 19, wherein step (b) includes the substep of altering at least a portion of the boundary in accordance with the first predetermined function.

26. A method according to claim 25, wherein the first predetermined function includes a sinusoidal function for generating a ripple effect that is applied to at least some of the boundary.

27. A method according to claim 26, including the step, prior to step (b), of defining a datum overlying at least part of the font character, the ripple effect being applied to the boundary on only one side of the datum.

28. A method according to claim 27, wherein the datum is disposed horizontally across the font character.

29. A method according to claim 1, applied to a plurality of font characters forming a text string.

30. A method according to claim 1, wherein step (a) includes the substep of providing:
a True Type Font ("TTF");
a True Type Collection ("TTC") of TTFs; or
one or more Glorious Fonts (" GLF"s).

31. A method of creating an animated font character, the method including the steps of:
(a) providing a series of glyphs and a font structure, the series of glyphs and the font structure representing font characters;
(b) providing a predetermined function defining at least one characteristic feature of at least one of the glyphs or a part thereof, said predetermined function generating an output value based on at least one variable parameter having an initial value;
(c) rendering said font character in accordance with the output of the predetermined function;
(d) altering the value of said variable parameter ;
(e) repeating steps (c) and (d), thereby to generate an animated sequence of rendered frames for the font character; and
(f) displaying the animated sequence on a display or storing it in memory for subsequent reproduction.

32. A method according to claim 31, wherein step (b) includes the substep of providing a function that results in an output that varies in a cyclic fashion as the value of said variable parameter is altered.

33. A method according to claim 32, wherein step (d) includes the substep of linearly increasing the value of said variable parameter, and periodically resetting the value to its initial value.

34. A method according to claim 33, wherein the function is selected to provide a sinusoidal output in response to a linearly increasing and resetting value of said variable parameter.

35. A method according to claim 31, wherein step (d) includes the substep of altering the value of said variable parameter such that the output of the function varies in a cyclic fashion.

36. A method according to claim 35, wherein step (d) includes the substep of altering the value of said variable parameter in accordance with a sinusoidal function.

37. A method according to claim 31, wherein the part of said glyph is a sub-glyph associated with the font character.

38. A method according to claim 37, wherein the sub-glyph includes visual features applied to the font character.

39. A method according to claim 31, wherein the glyph includes an outline shape of the font character.

40. A method of creating a computer animated font character comprising the steps of:
  (a) providing a series of glyphs and a font structure representing font characters;
  (b) providing a predetermined function describing at least one characteristic feature of part or all the glyph, wherein said predetermined function has at least one variable parameter;
  (c) rendering said font character in accordance with the predetermined function;
  (d) altering said variable parameter; and
  (e) repeating steps (c) and (d) to provide an animated sequence for the font character.

41. The method of paragraph 40, wherein said part of the glyph is a sub-glyph of the font character.

42. The method of paragraph 40, wherein said predetermined function is a cyclic function.

43. The method of paragraph 40, wherein said glyph includes an outline shape of the font character.

44. The method of paragraph 41, wherein said sub-glyph includes artistic work applied to the font character.

45. Apparatus for creating an animated font character based on an initial non-animated font character, the method including the steps of:
  (a) means for providing a glyph representative of at least one aspect of the non-animated font character;
  (b) means for applying a first predetermined function to the glyph, thereby to generate a modified glyph;
  (c) means for providing a second predetermined function for generating an output dependent upon a value of a variable parameter, the variable parameter having an initial value, wherein a visual appearance of the modified glyph is based at least partly on the output of said second predetermined function;
  (d) means for rendering said modified glyph;
  (e) means for altering the value of the variable parameter; and
  (f) display means for displaying the animated sequence on a display;
  such that, upon repeatedly applying means (d) and (e), a plurality of rendered modified glyphs that together define an animated font character are generated, the resultant animated font being displayed on the display means.

46. Apparatus for creating an animated font character based on an initial non-animated font character, the method including the steps of:
  (a) means for providing a glyph representative of at least one aspect of the non-animated font character;
  (b) means for applying a first predetermined function to the glyph, thereby to generate a modified glyph;
  (c) means for providing a second predetermined function for generating an output dependent upon a value of a variable parameter, the variable parameter having an initial value, wherein a visual appearance of the modified glyph is based at least partly on the output of said second predetermined function;
  (d) means for rendering said modified glyph;
  (e) means for altering the value of the variable parameter; and
  (f) storage means for storing the rendered modified glyphs generated by said rendering means;
  such that, upon repeatedly applying means (d) and (e), a plurality of rendered modified glyphs that together define an animated font character are generated, the plurality of rendered modified glyphs being stored in the storage means.

47. A computer storage medium bearing one or more computer programs, in compiled or uncompiled form, for creating an animated font character when executed on a suitable computer apparatus, the animated font character being based on an initial non-animated font character defined in part by a glyph representing at least one aspect thereof, the computer program or programs including instructions for implementing the steps of:
  (a) applying a first predetermined function to the glyph, thereby to generate a modified glyph;
  (b) providing a second predetermined function for generating an output dependent upon a value of a variable parameter, the variable parameter having an initial value, wherein a visual appearance of the modified glyph is based at least partly on the output of said second predetermined function;
  (c) rendering said modified glyph;
  (d) altering the value of the variable parameter;
  (e) repeating steps (c) and (d), thereby to generate a plurality of rendered modified glyphs that together define an animated font character.

48. A computer storage medium according to claim 47, wherein the one or more computer programs include instructions for displaying the plurality of rendered modified glyphs on a display associated with computer apparatus upon which the program or programs are to be run.

49. A computer storage medium according to claim 47, wherein the one or more computer programs include instructions for storing the plurality of rendered modified glyphs in memory associated with computer apparatus upon which the program or programs are to be run.

* * * * *

UNITED STATES PATENT AND TRADEMARK OFFICE
CERTIFICATE OF CORRECTION

PATENT NO. : 6,504,545 B1 Page 1 of 1
DATED : March 29, 1999
INVENTOR(S) : Cameron Bolitho Browne et al.

It is certified that error appears in the above-identified patent and that said Letters Patent is hereby corrected as shown below:

Column 3,
Line 3, "(" GOB")" should read -- ("GOB") --.

Column 5,
Line 56, "font file " should read -- font file" --.

Column 6,
Line 21, ""cached "" should read -- ("cached" --.

Column 7,
Line 50, ""B " 1110," should read -- "B" 1110. --; and ""B " 1110" should read -- "B" 1110 --;
Line 62, ""GOB " 1220" should read -- "GDB" 1220 --.

Column 8,
Line 25, "follicles" should read -- follicles' --;
Lines 26-33, close up left margin.

Column 15,
Line 4, "glop." should read -- glyph. --.
Line 36, "glop;" should read -- glyph; --.

Signed and Sealed this

Seventh Day of October, 2003

JAMES E. ROGAN
*Director of the United States Patent and Trademark Office*